US012806704B2

(12) United States Patent
Söllinger et al.

(10) Patent No.: US 12,806,704 B2
(45) Date of Patent: Nov. 24, 2026

(54) WELDING METHOD AND ASSEMBLY WITH MEASUREMENT VALUE SYNCHRONIZATION

(71) Applicant: Fronius International GmbH, Pettenbach (AT)

(72) Inventors: Dominik Söllinger, Pettenbach (AT); Manuel Mayer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 1408 days.

(21) Appl. No.: 17/602,387

(22) PCT Filed: Apr. 9, 2020

(86) PCT No.: PCT/EP2020/060166
§ 371 (c)(1),
(2) Date: Oct. 8, 2021

(87) PCT Pub. No.: WO2020/208144
PCT Pub. Date: Oct. 15, 2020

(65) Prior Publication Data

US 2022/0161348 A1 May 26, 2022

(30) Foreign Application Priority Data

Apr. 10, 2019 (EP) .................................... 19168536

(51) Int. Cl.
*B23K 9/10* (2006.01)
*B23K 9/007* (2006.01)
(Continued)

(52) U.S. Cl.
CPC ............ *B23K 9/1012* (2013.01); *B23K 9/007* (2013.01); *B23K 9/0956* (2013.01); *B23K 9/1075* (2013.01); *B23K 37/02* (2013.01)

(58) Field of Classification Search
CPC ...... B23K 37/02; B23K 9/007; B23K 9/0956; B23K 9/1012; B23K 9/1075;
(Continued)

(56) References Cited

U.S. PATENT DOCUMENTS 4,322,602 A 3/1982 Grist
4,595,820 A * 6/1986 Richardson .......... B23K 9/0956 219/130.21
(Continued)

FOREIGN PATENT DOCUMENTS

EP 0 787 555 A1 8/1997
JP H09206939 A 8/1997
JP 2007083268 A 4/2007

OTHER PUBLICATIONS

International Search Report issued in International Patent Application No. PCT/EP2020/060166, dated Aug. 4, 2020, along with an English translation thereof.
(Continued)

*Primary Examiner* — Phuong T Nguyen
(74) *Attorney, Agent, or Firm* — GREENBLUM & BERNSTEIN, P.L.C.

(57) ABSTRACT

A stable welding process for a welding method in which at least one welding device is used for welding. During the welding process carried out using the welding device, synchronization information is transmitted to the at least one welding device from at least one other electric device, in which a device current that changes over time flows in a device current circuit at least at one point in time, and the at least one welding device is designed to use the obtained synchronization information in order to ignore measurement values detected at the point in time for the measurement variable.

16 Claims, 2 Drawing Sheets

Figure 1:
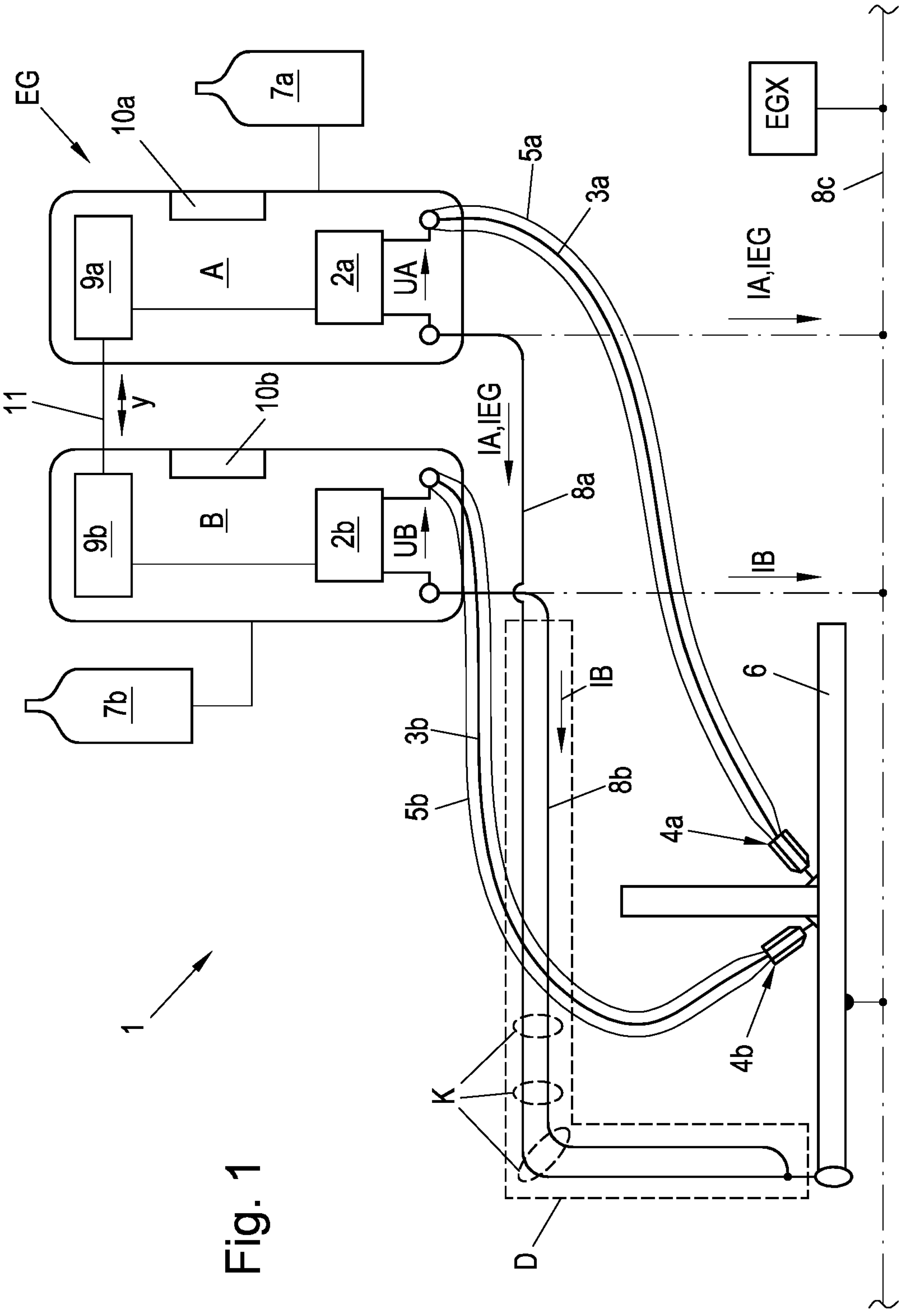

(51) Int. Cl.
*B23K 9/095* (2006.01)
*B23K 37/02* (2006.01)

(58) Field of Classification Search
CPC .............. B23K 11/253; B23K 11/3063; B23K 37/0258; B23K 11/115; B23K 11/311; B23K 31/125; B23K 11/3072
USPC ... 219/130.21, 121.38, 137.71, 137.2, 137.7, 219/124.1
See application file for complete search history.

(56) References Cited

U.S. PATENT DOCUMENTS

| | | | | |
|---|---|---|---|---|
| 5,866,873 | A | 2/1999 | Wang et al. | |
| 7,049,547 | B1 * | 5/2006 | Brunner | B23K 9/1062 219/132 |
| 2007/0007265 | A1 * | 1/2007 | Myers | B23K 9/0953 219/130.51 |
| 2015/0343549 | A1 | 12/2015 | Henry et al. | |
| 2017/0028501 | A1 * | 2/2017 | Radtke | B23K 9/1006 |

OTHER PUBLICATIONS

Written Opinion of the International Searching Authority issued in International Patent Application No. PCT/EP2020/060166, dated Aug. 4, 2020.
International Preliminary Report patentability issued in International Patent Application No. PCT/EP2020/060166, dated Mar. 31, 2021.
Office action, delivered Dec. 14, 2022, from family member Japanese Patent Application No. 2021-559737, along with English language translation.

* cited by examiner

WELDING METHOD AND ASSEMBLY WITH MEASUREMENT VALUE SYNCHRONIZATION

The invention relates to a welding method in which a welding process is carried out with at least one welding device, wherein the at least one welding device detects an electrical measurement variable in a welding current circuit to control the welding process of the welding device, wherein during the welding process carried out using the welding device synchronization information is transmitted to the at least one welding device from at least one other electrical device in which a device current that changes over time flows in a device current circuit at least at one point in time. The invention further relates to a welding assembly with at least one welding device for carrying out a welding process, wherein the at least one welding device is configured to detect an electrical measurement variable in its welding current circuit to control the welding process, wherein at least one other electrical device is provided in which a device current that changes over time flows in a device current circuit at least at one point in time, wherein the at least one electrical device is connected to the at least one welding device by means of a communication connection, wherein the at least one electrical device is configured to transmit synchronization information to the at least one welding device.

During welding with consumable electrodes (e.g. MIG/MAG welding, submerged arc welding) or non-consumable electrodes (e.g. TIG welding), welding is often carried out in the immediate vicinity of one or more other electrical devices. For example, a further welding device could be provided as the electrical device, so that welding is carried out simultaneously with a plurality of mutually independent welding devices, for example in order to increase the welding performance. For this purpose, the plurality of welding devices and/or other electrical devices can be arranged directly next to one another or in the immediate vicinity of one another, for example in a common space such as a welding cell. As an electrical device, however, a welding robot for guiding a welding torch, a spot welding device, etc. is often also arranged in the vicinity of the welding device.

Each welding device usually has its own welding current source as well as a ground line and a welding torch with a welding electrode, which during operation form a welding current circuit across an (electrically conductive) workpiece. Instead of separate ground lines for each welding device, a common ground line is often used, for example a so-called busbar, which serves as a common electrical potential. Other electrical devices, such as a welding robot, in turn each have their own device current circuit. For example, a device current circuit could be provided for several drive motors of the available axes of the welding robot, or a device current circuit could be provided for other electrical devices, such as a spot welding gun of a spot welding device.

For welding, an arc is ignited in a known manner with each welding device between the electrode of the welding torch and the workpiece. On the one hand, the arc partially melts the workpiece, creating a so-called weld pool. On the other hand, the arc melts an additive which is supplied to the weld pool and can either be the electrode itself (MIG/MAG) or a separately supplied filler material (TIG).

In most cases, a so-called protective gas is also used to shield the weld pool from the ambient air. Often a common hose package is provided in which the consumable electrode material, for example in the form of a welding wire, is fed to the welding torch together with a protective gas line.

Further lines can also be provided in the hose package, for example a supply and return line for a cooling medium for the welding torch, or control lines.

A plurality of welding devices can be used for welding simultaneously on the same workpiece or on separate workpieces. So-called multiple welding processes are also known, in which a plurality of welding processes are carried out simultaneously on a workpiece. Two (or more) welding wires can also be fed to a common weld pool.

In order to carry out a defined welding process, specific welding parameters are generally set on the respective welding device, for example by a suitable control unit of the welding device and/or by a user. Such welding parameters are, for example, a welding voltage, a welding current and a welding wire feed speed of the consumable electrode (MIG/MAG) or the filler material (TIG), whereby different welding parameters can be set for different welding processes. As a rule, while the welding process is being carried out, the welding device also detects an electrical measurement variable, for example the welding voltage, the welding current, or an electrical resistance of the welding current circuit.

The detected measurement variable is processed by the welding device in order to monitor, control or regulate the welding process. Known welding processes that are carried out with a welding device are, for example, a pulse welding process, a short arc welding process or a short arc welding process with reversing wire electrode (e.g. a so-called cold metal transfer welding process), wherein there are of course also other welding processes such as a spray arc welding process, mixed processes, welding process with rotating arc, etc. In the welding processes mentioned, a defined cyclical change in the welding current can take place in the welding current circuit in question, which leads to a droplet separation from the melting electrode or the filler material.

It can often happen that the welding devices are positioned in space relative to one another in such a way that their welding current circuits partially cross and/or partially run parallel (which of course is relative to the electrical lines of the welding current circuits). It can also happen that the welding current circuit of a welding device crosses or runs parallel to the device current circuit of another electrical device, for example the device current circuit of a welding robot. For example, the ground lines of individual welding devices arranged next to one another can, for practical reasons, be laid essentially parallel between the welding devices and a welding workstation. The hose packages that lead to the welding torches can sometimes also cross, for example when welding is performed on several sides of a workpiece, or can be guided in parallel. In spite of the electrical insulation of the current-carrying lines, this can lead to the welding current circuits of the welding devices influencing each other electromagnetically.

This can lead to problems in particular in the above-mentioned welding processes with variable welding currents during a welding cycle. In a pulse welding process, the welding current changes, for example, in periodically repeated welding cycles between a base current and a pulse current, wherein it is possible for steep current rising edges and current falling edges to be provided. The welding current that changes over time in a first welding current circuit generates a magnetic field that changes over time around the welding current line leading to the welding torch, but also via the return ground line. This magnetic field can in turn induce an electrical voltage in a second (or further)

welding current circuit, in particular if the second welding current circuit is arranged in the vicinity of the first welding current circuit.

This induced voltage can lead to the measurement variable detected in the second welding current circuit, in particular a welding voltage, being detected incorrectly because the inductive coupling can cause voltage peaks that influence the measurement. For example, when the welding voltage is detected, a falsified value can be measured due to the induced voltage. The incorrect measurement value can then have a disadvantageous effect on the regulation or control of the respective welding process, and in particular this can lead to an unstable welding process. If two (or more) welding processes are carried out at the same time, each with pulse-like welding currents, the two (or more) welding processes can also interfere with one another and influence the measurement.

If several welding devices and/or electrical devices use a common ground line, for example a busbar, in some circumstances this can lead to fluctuations in the electrical potential of the busbar. The usually variable welding currents in the welding current circuits and/or the device currents in the device current circuits can cause a voltage drop on the common busbar, since this simply represents an ohmic resistance. As a result, another welding device may detect an inaccurate or incorrect measurement value, for example a voltage or a resistance, in its welding current circuit, which can have a negative effect on the welding process.

EP 0 787 555 A1 discloses a method and a control device for controlling a pulse welding process. A "droplet separation detector" is arranged in the control device to detect droplet separation on the basis of the welding voltage and transmits a signal to an "output compensator." In the event of a short circuit, the welding voltage increases, which can lead to incorrect detection of the droplet separation. To avoid this, the "output compensator" ignores the signal from the "droplet detector" when a short circuit occurs.

Accordingly, the object of the invention is to ensure a more stable welding process for a welding method in which at least one welding device is used for welding.

The object is achieved according to the invention in that the at least one welding device uses the synchronization information received to ignore the measurement values of the measurement variable detected at the point in time. The synchronization information preferably contains information about a device current change over time in the device current circuit that influences the measurement variable of the welding device, and the welding device uses the synchronization information to ignore the measurement values of the measurement variable detected during the device current change which influences the measurement variable. This ensures that the measurement variable that is used to control the welding process is not negatively influenced by another electrical device, so that a more stable welding process is created, wherein ignoring the measurement values should naturally also be understood as an interruption of the measurement value detection.

An electrical component of a welding system, in particular a spot welding device or a welding robot, is preferably used as the electrical device. As a result, common devices in the vicinity of the welding device can be taken into account, which can adversely affect the welding process.

Advantageously, the electrical device used is a welding device that carries out a welding process with a welding current that changes over time, wherein the welding device that carries out the welding process with the welding current that changes over time transmits synchronization information about a change in the welding current of the welding process carried out that affects the measurement variable of the relevant other welding device which detects the measurement variable and that the welding device that detects the measurement variable uses the synchronization information received in order to ignore the measurement values of the measurement variable detected during the change in the welding current that affects the measurement variable. This ensures that the measurement variable is not negatively influenced by another welding device, so that a more stable welding process is created, even if another welding device is being used in the vicinity.

Advantageously, at least two welding devices each carry out a welding process with a welding current that changes over time, wherein each of the at least two welding devices detects a measurement variable in its welding current circuit, wherein the welding devices bidirectionally exchange synchronization information about the change in the welding current of the welding process being carried out which influences the measurement variable of the other welding device, and the welding devices use the synchronization information received from the other welding device in order to ignore the measurement values of the measurement variable detected during the changes in the welding current. This ensures that two or more welding devices do not adversely affect one another, so that, for example, more stable welding processes can be carried out with two or more welding devices.

A pulse welding process, a short arc welding process, a spray arc welding process or a welding process with reversing welding wire feed is preferably used as the welding process with a welding current that changes over time. This allows the method to be used in the most common welding processes.

The transmitted synchronization information advantageously contains temporal information about a start and an end of the change in the device current and/or change in welding current, wherein the measurement values of the measurement variable detected by the welding device receiving the synchronization information between the start and the end of the change in the device current and/or the change in the welding current can be ignored. This creates a simple possibility for providing synchronization information.

It is advantageous if the synchronization information is transmitted a certain lead time before the change in the device current and/or the change in the welding current. As a result, the synchronization information can already be transmitted at an early stage in the case of known current profiles, so that, for example, any delays in the data transmission can be compensated for.

A welding voltage and/or a welding current and/or an electrical welding resistance is advantageously detected as the measurement variable, since these electrical variables are common measurement values for regulating a welding process.

It is also advantageous if at least one welding device transmits the detected measurement variable to an external device for further use and the external device uses the detected measurement variable to control a process of the external device or to analyze the welding process of the welding device, wherein the external device is preferably a welding robot which guides a welding torch of the welding device in order to produce a weld seam and the welding robot uses the measurement variable obtained to control a movement of the welding torch. As a result, the correctly detected measurement variable can be used for other purposes in a practical manner.

In the following, the present invention is described in greater detail with reference to FIGS. 1 to 2 which, by way of example, show schematic and non-limiting advantageous embodiments of the invention. In the drawings, FIG. 1 shows a welding assembly with two welding devices and a workpiece, FIG. 2 shows a time profile of the welding currents of two welding current circuits, a time profile of synchronization information and a time profile of a detected measurement variable.

Figure 2:
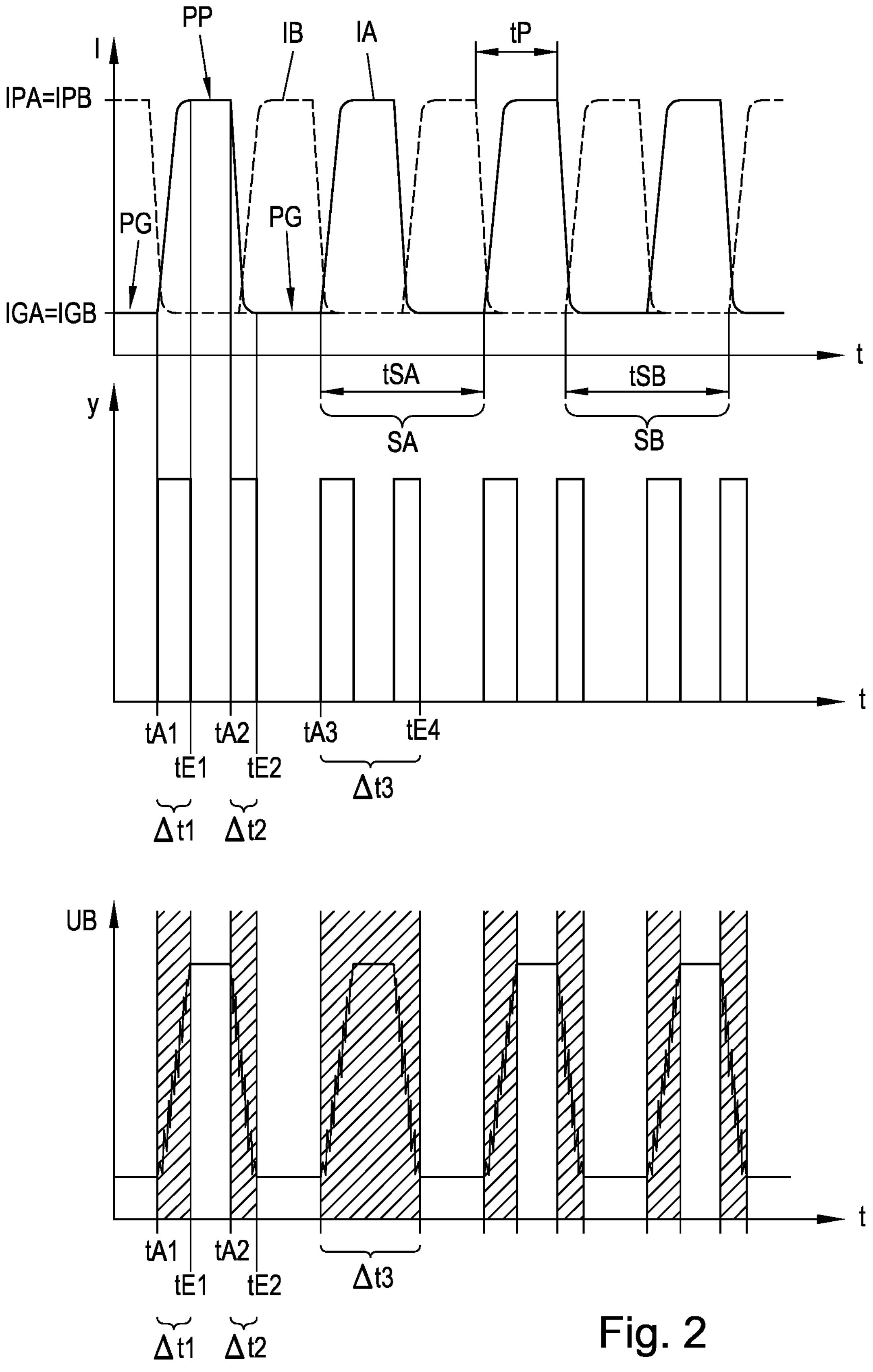

In FIG. 1, a welding assembly 1 with two mutually independent welding devices A, B is shown in simplified form by way of example. The welding devices A, B are designed here as MIG/MAG welding devices with a consumable electrode, but of course one or more TIG welding devices with a non-consumable electrode or a laser hybrid welding device could also be used. In the example shown, a welding process is carried out on a common workpiece 6 with both welding devices A, B at the same time. Of course, more than the two welding devices A, B shown could also be provided. In general, however, only one welding device B could be provided, and instead of the second welding device A, another electrical device EG, such as an electrical component of a welding system, for example a welding robot, could be provided. However, the arrangement of two welding devices A, B is sufficient for an understanding of the invention. The welding devices A, B do not necessarily have to be designed as separate units, but it would also be conceivable that the two (or more) welding devices A, B are arranged, for example, in a common housing. However, this does not change the fact that each welding device A, B forms its own welding current circuit for carrying out a welding process.

As is known, the welding devices A, B each have a welding current source 2*a*, 2*b*, a welding wire feed unit (not shown) and a welding torch 4*a*, 4*b* (MIG/MAG welding devices). In other welding methods, such as electrode welding, in which a rod electrode is fed to a welding point by hand, the welding wire feed unit can of course be omitted. The welding current sources 2*a*, 2*b* each provide the required welding voltage UA, UB, which is applied to a welding wire 3*a*, 3*b* as a consumable electrode (or to a non-consumable electrode in the case of a welding method with a consumable electrode such as TIG welding). The welding wire 3*a*, 3*b* is fed to the relevant welding torch 4*a*, 4*b* by means of the welding wire feed unit at a certain welding wire feed speed.

The supply can take place, for example, within a hose package 5*a*, 5*b* or also outside of it. The welding wire feed unit can each be integrated in the welding device A, B, but can also be a separate unit. In order to carry out a welding process, an arc is ignited between the welding wire 3*a*, 3*b* and the workpiece 6. On the one hand, the material of the workpiece 6 is locally melted by the arc and a so-called weld pool is generated. On the other hand, the welding wire 3*a*, 3*b* is fed to the weld pool by means of a certain welding wire feed speed and is consumed by the arc in order to apply material of the welding filler material to the workpiece 6. When the welding torch 4*a*, 4*b* moves relative to the workpiece 6, a weld seam can be formed thereby.

In the respective hose package 5*a*, 5*b*, further lines can optionally also be provided between the welding device A, B and the relevant welding torch 4*a*, 4*b* (for example a control line or a coolant line). A protective gas is often also used to shield the weld pool from the ambient air, in particular the oxygen it contains, in order to avoid oxidation. As a rule, inert gases (for example argon) or active gases (for example CO2) are used, which can also be fed to the welding torch 4*a*, 4*b* via the hose package 5*a*, 5*b*. The protective gases are usually stored in separate (pressure) containers 7*a*, 7*b*, which can be fed to the welding devices A, B (or directly to the welding torch 4*a*, 4*b*), for example via suitable lines. If the same protective gas is used, a common container for both (all) welding devices A, B could also be provided. Of course, welding can also be carried out without protective gas if necessary. The hose package 5*a*, 5*b* can be coupled to the welding torch 4*a*, 4*b* and to the welding device A, B, for example via suitable couplings.

In order in each case to form a welding current circuit of the welding devices A, B, in the example shown the welding current sources 2*a*, 2*b* are each connected to the workpiece 6 with a ground line 8*a*, 8*b*. One pole of the welding current source 2*a*, 2*b*, usually the positive pole, is connected to the ground line 8*a*, 8*b*, the other pole of the welding current source 2*a*, 2*b*, usually the negative pole, is connected to the welding electrode (or vice versa). A welding current circuit is thus formed for each welding process via the arc and the workpiece 6. Of course, welding devices A, B could also be used to weld on their own workpiece 6. The corresponding ground line 8*a*, 8*b* must then of course be connected to the respective workpiece 6. In the example shown in FIG. 1, the two ground lines 8*a*, 8*b* are laid essentially directly next to one another in parallel over a large area D of their length. This proximity of the electrical ground lines 8*a*, 8*b* to one another can, in spite of an electrically non-conductive insulation, lead to the ground lines 8*a*, 8*b* influencing one another electromagnetically, as mentioned at the beginning. The electromagnetic coupling is indicated schematically by magnetic circles K in FIG. 1. In the same way, however, the welding current lines to the welding torches 4*a*, 4*b* can partially cross or run in parallel, which can also lead to an electromagnetic coupling.

If, for example, another electrical device EG, such as a welding robot (not shown), is provided instead of the welding device A, an electromagnetic coupling can result between the ground line 8*b* of the welding device B and an electrical connection line of the electrical device EG, for example when the ground line 8*b* and the electrical connection line of the electrical device EG cross or are in close proximity to one another.

In an alternative embodiment, instead of the two separate ground lines 8*a*, 8*b*, a common ground line 8*c* could also be used, as indicated by dash-dotted lines in FIG. 1. For example, a so-called busbar can advantageously be used as a common electrical potential for a plurality of electrical devices. In addition to the illustrated welding devices A, B, further electrical devices EGX, for example a welding robot, in particular the electrical drives thereof, could also be connected to the busbar 8*c*. Thus, a common ground line 8*c* forms an ohmic resistance in a simplified manner.

In particular, if a welding process with a welding current IA, IB that changes over time is carried out with one (or both) welding devices A, B, a voltage induced in the other ground line 8*a*, 8*b* can lead to an unstable welding process due to incorrect measurement variables, in particular when measuring the welding voltage UA, UB, as will be explained in detail below. If another electrical device EG is provided instead of the second welding device A (or in addition), the same applies if a device current IEG that changes over time flows in the device current circuit and influences the detected measurement variable of the welding device B.

Such device currents IEG that change over time are to be understood in particular as those current changes which, for example, change the welding voltage UB as an electrical measurement variable in the range of 0.5-20V, in particular between 3-8V.

In the context of the invention, welding processes with a welding current that changes over time are to be understood in particular as those welding processes in which welding cycles with welding currents I of different levels alternate periodically, wherein the change in the welding current is sufficiently great and takes place sufficiently quickly to induce a voltage in an adjacent welding current circuit, in order to influence the detection of measurement values. As a rule, the welding currents I vary in the range between 3 A-1500 A, in particular between 20 A-750 A. Typical changes in the current over time are, for example, in the range between 10-5000 A/ms, preferably 100-2000 A/ms, in particular 300-1500 A/ms. A pulse welding process, a short arc welding process, a welding process with reversing welding wire movement, etc. are often used as welding processes with variable welding current. Details in this regard are known to a person skilled in the art. The present invention is explained below in more detail with reference to FIG. 2, but the invention is not limited thereto and also covers any other welding process with a welding current that changes over time.

A control unit 9*a*, 9*b* which controls and monitors the relevant welding process is also provided in each of the welding devices A, B. For this purpose, the welding parameters required for the welding process, such as the welding wire feed speed, the welding current IA, IB, the welding voltage UA, UB, the pulse frequency, the pulse current duration, etc. are predetermined or adjustable in the control unit 9*a*, 9*b*. To control the welding process, the control unit 9*a*, 9*b* is connected to the welding current source 2*a*, 2*b*. A user interface 10*a*, 10*b* connected to the control unit 9*a*, 9*b* can also be provided for input or display of certain welding parameters or a welding status. The described welding devices A, B are of course well known, which is why they will not be discussed in more detail at this point.

The two welding torches 4*a*, 4*b* can also be arranged locally relative to one another in such a way that these welding wires 3*a*, 3*b* work on the workpiece 6 in a common weld pool, instead of in two separate weld pools, as shown in FIG. 1. This arrangement with respect to one another can be fixed, for example in that both welding torches 4*a*, 4*b* are arranged on a welding robot (not shown) which guides both welding torches 4*a*, 4*b*. The arrangement can, however, also be variable, for example in that one welding torch 4*a*, 4*b* is guided by a welding robot. However, a common welding torch could also be provided for both welding wires 3*a*, 3*b*. It is irrelevant whether the welding torches 4*a*, 4*b* are used for joint welding or build-up welding or some other welding method.

It is essential for the invention that at least one welding device (in this case the welding device B) with which a welding process is carried out is provided in the welding assembly 1. The at least one welding device, in this case the welding device B, detects an electrical measurement variable in its welding current circuit to control its welding process. For example, a welding voltage UB (usually based on the ground potential) and/or a welding current IB in the welding current circuit and/or an electrical welding resistance can be used as the measurement variable. Often a welding wire feed speed is also used, but this is not influenced by an induced voltage or a voltage drop.

The measurement variable can be detected, for example, by the welding current source 2*b* or by the control unit 9*b* of the corresponding welding device B, or also by a separate measuring device (not shown). A device current IEG that changes over time flows in a device current circuit of an electrical device EG at least at one point in time, the second welding device A being provided as the electrical device EG in the present example. Of course, however, a welding robot (not shown) could also be provided as the electrical device EG, in the device current circuit of which a device current IEG that changes over time flows at least at one point in time. For example, the device current of a drive motor of a welding robot could change in accordance with a certain movement sequence or operating state of the welding robot in such a way that the measurement variable detected by the welding device B is influenced.

In the specific example, the welding device A (as an electrical device EG) is provided to carry out a welding process with a welding current IA that changes over time, for example a pulse welding process, as will be explained in more detail below with reference to FIG. 2. Of course, however, both welding devices A, B can each carry out a welding process with a welding current IA, IB that changes over time and both welding devices A, B can each detect a measurement variable for controlling the particular welding process, e.g. a welding voltage UA, UB in each case.

The welding devices A, B are connected by means of a communication connection 11 via which synchronization information Y can be exchanged, preferably bidirectional, between the welding devices A, B. The communication connection 11 can be, for example, a wired or wireless connection between the control units 9*a*, 9*b* or between the user interfaces 10*a*, 10*b*. If, instead of the welding device A, another electrical device EG is provided (or an additional one), then this other electrical device EG is connected to the welding device B by means of the communication connection 11. For example, the communication connection 11 could be provided between the control unit 9*b* of the welding device B and a control unit of a welding robot.

The welding device A (which carries out the welding process with the welding current IA that changes over time—see FIG. 2) or generally the electrical device EG transmits synchronization information Y via the communication connection 11 to the welding device B (the welding device that detects the measurement variable). The welding device A, or the control unit 9*a*, usually of course has knowledge of the welding process carried out and of the time profile of the welding current IA or of the welding voltage UA, and thus knows when the welding current IA or the welding voltage UA change.

The welding device B, in particular the control unit 9*b*, processes the received synchronization information Y in order to ignore the measurement values of the measurement variable detected at the point in time of the variable device current IEG (in this case the welding current IA). The synchronization information Y preferably contains information about a change in the device current over time in the device current circuit of the electrical device EG (in this case the welding device A), which influences the measurement variable of the welding device B, and the welding device B (which detects the measurement variable) uses the synchronization information Y, in order to ignore the measurement values of the measurement variable detected during the change in the device current that influences the measurement variable, as will be explained in detail below.

In this case ignoring can mean that although a continuous measurement is carried out by the welding device B, the measurement values detected during the change in the device current over time are not used to control the welding process. Ignoring can also mean, however, that the measurement value detection by the welding device B is interrupted during the change in the device current over time in the device current circuit, i.e. no measurement values at all are generated during this period. In this way, time periods with possible voltage or current peaks cannot be taken into account during the measurement and consequently incorrect measurements can be avoided. If, instead of the welding device A, another electrical device EG is used, for example a welding robot, it may be that the future course of the device current IEG is not known. In this case, for example, a threshold value for the device current IEG and/or for the change in the device current could be stored in a control unit of the electrical device EG and the synchronization information Y is transmitted to the welding device B when the threshold value is reached or exceeded when the current rises or is undershot in the event of a current fall.

In the simplest case, the synchronization information Y is a synchronization pulse P which is transmitted from the transmitting welding device A (or generally the electrical device EG) to the receiving welding device B via the communication connection 11. The synchronization pulse P can be transmitted as a current or voltage pulse on a wired communication connection 11 between the two welding devices A, B, for example. However, the communication connection 11 could also be designed, for example, as a data bus on which bus messages are sent. In this case, the synchronization pulse P can be transmitted as a bus message, which can be done both by wired means (cable, glass fiber, etc.) and also wirelessly (WiFi, Bluetooth, etc.).

In the upper area of FIG. 2, a diagram with the curves of the welding currents IA, IB of the two welding processes carried out simultaneously with the welding devices A, B is shown over the time t. Instead of the welding device A, however, an electrical device EG could generally also be provided, in the device current circuit of which a device current IEG that changes over time flows at least at one point in time, in particular a device current IEG that influences the measurement variable detected by the welding device B. The solid line represents the course of the welding current IA of the welding process of the welding device A, and the dashed line represents the course of the welding current IB of the welding process of the welding device B. The diagram in the middle shows a course of synchronization information Y over time t, which is transmitted from welding device A to welding device B via communication connection 11. The synchronization information Y is processed by the welding device B in order to ignore the detected measurement values of the measurement variable at the point in time of the at least one change in the device current over time, in this case during the change in the welding current in the welding process of the welding device A. In the lower diagram, the detection of the welding voltage UB as a measurement variable of the welding device B is plotted over the time t.

It can be seen from this that, in the example shown, a welding process with a welding current IA, IB that changes over time is carried out with both welding devices A, B, in particular a pulse welding process in each case. However, it would also be possible that only one welding device, e.g. welding device A, carries out a welding process with a welding current IA that changes over time, which influences the measurement variable of the other welding device, in this case welding device B, or that a current IEG that changes over time flows in the device current circuit of another electrical device EG and influences the measurement variable of the welding device B. As mentioned, it is not necessary to use two identical welding methods (e.g. two MIG/MAG welding methods), but two (or more) different welding methods can also be carried out.

During the pulse welding in MIG/MAG welding, a base current IG and a pulse current IP that is increased by comparison therewith alternate periodically with a predetermined pulse frequency f, as can be seen in FIG. 2. The pulse frequency f results as the reciprocal of the period duration tS of a welding cycle S consisting of a pulse current phase PP with the pulse current IP and a base current phase PG with the base current IG. Preferably, a molten material droplet is released into the weld pool during the pulsed current phase PP. The pulse frequency f and/or the value of the base current IG or pulse current IP can also change during a weld. The time curves of the welding currents IG, IP are of course idealized and are shown in a simplified manner in FIG. 2. Often short intermediate current pulses (not shown) are provided in the base current phase PG in order to increase the process stability. However, this does not change the period tS of a welding cycle S and the resulting pulse frequency f.

Depending on the wire diameter and electrode material, the welding wire feed speed, the welding currents, the base current and pulse current durations and the pulse frequency f are preferably coordinated so that a droplet is generated and detached with each current pulse. The welding wire feed speed and pulse frequency f are generally dependent on one another. For the sake of simplicity, the curves of the welding currents IA, IB are shown essentially identically in FIG. 2, with identical base currents IGA=IGB and pulse currents IPA=IPB and are temporally spaced apart merely by a specific phase shift tP. Of course the curves could also differ; in particular, different pulse frequencies fA, fB, welding currents or pulse durations can be provided. Likewise, of course, a different phase shift, and, of course, no phase shift, can also be provided.

If instead of two independent welding processes with separate weld pools (see FIG. 1), for example, a multiple pulse welding process is used in which both welding wires 3*a*, 3*b* work in a common weld pool, the two pulse welding processes are advantageously synchronized with one another. The pulse frequencies fA=1/tSA, fB=1/tSB of the two pulse welding processes are then preferably in a certain predetermined relationship to one another and the resulting welding cycles SA, SB have a certain predetermined phase relationship to one another. Preferably the pulse frequencies fA, fB are in an integer ratio to one another.

The middle diagram in FIG. 2 shows the course of exemplary synchronization information Y over time t, wherein the time t is synchronous with the time tin the upper diagram. The welding device A, or the control unit 9*a*, monitors the course of the welding current IA in order to ascertain changes in the welding current over time $$\frac{dI_A}{dt}.$$

If the control unit 9*a* ascertains a specific change in the welding current $$\frac{dI_A}{dt}$$

that is predetermined or adjustable (for example by welding parameters), synchronization information Y is transmitted to the welding device B via the communication connection 11 (see FIG. 1). The future course of the welding current IA over time can be known to the control unit 9*a*, for example on the basis of predetermined welding parameters of a welding program. As a result, the control unit 9*a* knows future welding current changes $$\frac{dI_A}{dt}$$

and can transmit corresponding synchronization information Y to the control unit 9*b* of the welding device B. However, ascertaining can also mean that the future temporal course of the welding current IA (or generally the device current IEG of an electrical device EG) is not known and the control unit 9*a* detects the welding current changes $$\frac{dI_A}{dt}$$

independently from the temporal course of the welding current IA, for example on the basis of predetermined or adjustable threshold values. In the case of another electrical device EG, a control unit of the electrical device EG transmits synchronization information Y to the welding device B via the communication connection 11. For example, each current edge limiting the pulse current phase PP can be recognized. In the example shown, the control unit 9*b* of the welding device B processes this synchronization information Y obtained during the welding current changes $$\frac{dI_A}{dt}$$

in order to ignore the measurement values of the measurement variable detected in the welding process of the welding device A, as indicated in the lower diagram based on the welding voltage UB as the measurement variable. This can ensure that incorrectly detected measurement values of the measurement variable during the welding current changes $$\frac{dI_A}{dt}$$

cannot be used to control or regulate the welding process carried out with the welding device B. In fact a continuous measurement of the measurement variable is carried out, but those measurement values that are falsified due to the electromagnetic or ohmic coupling are hidden or ignored. Of course, it would also be possible, instead of ignoring the incorrect measurement values, for the detection of the measurement variable during the welding current changes $$\frac{dI_A}{dt}$$

to be interrupted so that during welding current changes $$\frac{dI_A}{dt}$$

no measurement values are generated.

The transmitted synchronization information Y preferably contains time information about a start and an end of the relevant welding current change $$\frac{dI_A}{dt}$$

and the welding device B, which receives the synchronization information Y, ignores the measurement values of the measurement variable in the period detected between the start and the end of the welding current change $$\frac{dI_A}{dt}$$

(or the measurement is interrupted).

In the example in FIG. 2, on the basis of the welding current change $$\frac{dI_A}{dt}$$

at the time tA1 the control unit 9*a* detects the start of the first current rise from the base current phase PG with the base current IG into the pulsed current phase PP with the pulsed current IP and detects the corresponding end of the first rise at the time tE1. Analogously, the start and the end of the first current fall are detected at the time tA2 and tE2, etc. The determined times tA1, tE1, tA2, tE2, . . . tAx, tEx are transmitted to the welding device B as synchronization information Y and the control unit 9*b* processes them in order to ignore the measurement values of the measurement variable detected during a period of time Δt1 between the times tA1 and tE1 and during a period of time Δt2 between the times tA2 and tE2, or in order to interrupt the detection of the measurement variable, as indicated by the hatched areas in the lower diagram.

The welding voltage UB of the welding device B is plotted as a measurement variable over the time t, wherein the time t is synchronous with the diagrams above. It can be seen that the control unit 9*b* (or a corresponding measuring device) ignores the measurement values of the measurement variable during the welding current change $$\frac{dI_A}{dt}$$

of the welding process of the welding device A or interrupts the detection of the measurement variable, in this case the welding voltage UB. In the example shown, the start and end of the current edges of the welding current IA (times tA1, tE1; tA2, tE2) are transmitted as synchronization information Y from the welding device A to the welding device B, and the welding device B or the control unit 9*b* ignores the measurement values detected during the time period Δt1 between the times tA1 and tE1 and during the time period Δt2 between the times tA2 and tE2 (and all further changes in welding current $$\left.\frac{dI_A}{dt}\right).$$

This ensures that the welding current changes $$\frac{dI_A}{dt}$$

of the welding process of welding device A do not adversely affect the welding process of the welding device B, and during the time in which a voltage interfering with the measurement can be induced in the welding current circuit of the welding device B (hatched areas) the measurement values are not used to control or regulate the welding process of the welding device B. Alternatively, as mentioned, the detection of the measurement variable, in particular the welding voltage UB, could of course be suspended. In the diagram shown, the interference with the measurement variable due to an irregular welding voltage UB during the welding current changes $$\frac{dI_A}{dt}$$

of the welding process of the welding device A is indicated by way of example (hatched areas). In reality, of course, other courses can also result, for example an overshoot of the measurement value at the start of a pulse current phase PP.

If not both current edges (current rise, current fall) of a pulse current phase PP of the welding process of welding machine A are critical with regard to a voltage induction in the welding current circuit of the welding device B or in general in the respective other welding current circuit(s) (for example, because the duration and/or magnitude of the welding current change induces only a negligible voltage or, in the case of a common ground line 8*c*, generates a negligible voltage drop), it could of course also be sufficient if the measurement values detected by welding device B only occur during the relevant welding current change $$\frac{dI_A}{dt}$$

of the welding process of the welding device A are ignored or the measurement value detection is interrupted, and not with every occurrence of a change in the welding current $$\frac{dI_A}{dt}.$$

Whether a change in the welding current $$\frac{dI_A}{dt}$$

is relevant can depend, for example, on the duration and/or the magnitude of the particular welding current change $$\frac{dI_A}{dt}$$

and can be stored, for example, as a threshold value in the control unit 9*a*.

However, the actual time information does not necessarily have to be transmitted as synchronization information Y, but it could also be sufficient to only transmit a synchronization pulse P (current or voltage) as synchronization information Y for a start/end of the at least one time change in the device current IEG, in particular a welding current change $$\frac{dI_A}{dt}.$$

The control unit 9*b* then ignores the detected measurement values of the measurement variable or starts using the measurement values (in this case the welding voltage UB) again when it receives a synchronization pulse P. It would also be conceivable, for example, that in the time period in which the measurement values are to be ignored or the measurement value detection is to be suspended, synchronization pulses P are continuously transmitted from the welding device A to the welding device B, and the welding device B uses the measurement values or continues the detection of the measurement variable again only when it no longer receives synchronization pulses P. If a data bus is provided as the data communication connection 11, instead of synchronization pulses P corresponding bus messages can be transmitted and received.

If a welding process with a welding current IA, IB that changes over time is carried out simultaneously with both welding devices A, B, for example a pulse welding process as indicated in FIG. 2, it is of course advantageous if both welding devices A, B each determine synchronization information YA, YB and mutually exchange them via the communication connection 11. In this way, the welding device A can ignore the measurement values of the measurement variable during welding current changes $$\frac{dI_B}{dt}$$

in the welding process of the welding device B or can interrupt the measurement and vice versa. If more than two welding devices A, B, . . . n are used at the same time, the welding current circuits of which have an electromagnetic or ohmic coupling, advantageously all welding devices A, B, . . . n involved mutually exchange synchronization information YA, YB, Yn.

The method according to the invention can preferably be activated and deactivated by a user, for example via the user interfaces 10*a*, 10*b*, and/or certain parameters can be set. It would be conceivable, for example, that a certain threshold value for a welding current change $$\frac{dI}{dt}$$

is predetermined and synchronization information Y is only determined or transmitted when this value is reached or exceeded and/or that a threshold value for the time period Δt can be set and synchronization information Y is only determined or transmitted when this value is reached or exceeded. As a result, the ignoring of measurement values or the interruption of the detection of the measurement variable can be omitted under certain circumstances if the threshold values are not reached. For example, a duration and/or a magnitude (e.g. difference between pulse current IP and base current IG) could be predetermined as the threshold value.

Furthermore, it can be advantageous if the synchronization information Y is transmitted to the other welding device(s) a certain lead time tv before the corresponding change in the welding current $$\frac{dI}{dt},$$

for example in order to compensate for delays in data transmission. Because the welding parameters (e.g. pulse frequency f, period duration tS, duration of a pulse current phase PP, duration of a base current phase PG, etc.) of a welding process and thus the course of the welding current I are usually known, the points in time and the time periods of future welding current changes $$\frac{dI_i}{dt}$$

are also known. It is thus possible to transmit the synchronization information Y to the other welding device a lead time tv before the actual welding current changes $$\frac{dI}{dt}.$$

For example, it could also be sufficient if only a first welding current change $$\frac{dI_A}{dt}$$

(in this case for example the time tA1) is transmitted as synchronization information Y (e.g. as synchronization pulse P at the time tA1) to the welding device B and additionally the relevant welding parameters of the welding process carried out with the welding device A are transmitted to the welding device B. The control unit 9*b* of the welding device B can then use this information to determine the points in time and the time periods of all future changes in the welding current $$\frac{dI_A}{dt}$$

in the welding process of the welding device A and can take it into account accordingly in order to interrupt the detection of the measurement variable.

However, if the welding parameters of the welding process and thus, for example, the future course of the welding current IA are not known in advance, the synchronization information Y from the control unit 9*a* can also only be transmitted immediately when a change in the welding current $$\frac{dI_A}{dt}$$

occurs which is recognized by the control unit 9*a*. This can be the case, for example, with dynamic arc length regulation, in which the welding parameters can change in order to regulate a specific target arc length. The same naturally also applies in general to other electrical devices EG of which the future course of the device current IEG is known or unknown.

The welding method according to the invention is particularly advantageous if a welding voltage U (in this case UB) is used as the measurement variable (in this case of the welding device B). Since the change in the welding current $$\frac{dI_A}{dt}$$

in the welding process of the welding device A induces a voltage in the welding current circuit of the welding device B due to the electromagnetic coupling of the welding current circuits, this induced voltage has a direct effect on the measured welding voltage UB. The same applies to an ohmic coupling of both welding current circuits, in which the voltage drop due to the change in the welding current $$\frac{dI_A}{dt}$$

in the welding process of the welding device A has an effect on the common electrical potential of the two welding current circuits and thus directly on the measured welding voltage UB of welding device B, as will be explained in more detail below. As a result, the welding voltage UB, which is usually continuously measured, can be falsified under certain circumstances, which can lead to an unstable welding process on the welding device B. With the welding method according to the invention, the detected measurement values of the welding voltage UB are ignored during the voltage induction or during the voltage drop, or the detection of the welding voltage UB is omitted and only then are the measurement values used again or the measurement is continued again. Of course, a welding current I and/or an electrical welding resistance can also be detected as a measurement variable and used to regulate the respective welding process.

As mentioned at the outset, instead of separate ground lines 8*a*, 8*b*, a common ground line 8*c* such as a busbar can be used, for which the welding device B and the welding device A (and/or another electrical device EG). In this case, the welding current circuits of the welding devices A, B (or the welding current circuit of the welding device B and the device current circuit of another electrical device EG) do not influence each other electromagnetically. As a result, when the device current $$\frac{dI_{EG}}{dt}$$

changes in the device current circuit of the electrical device EG (in the example shown, with a change in the welding current $$\frac{dI_A}{dt}$$

in the welding current circuit of the welding device A) no voltage induction takes place in the welding current circuit of the welding device B (which detects the measurement value). This means that there is no disadvantageous influence on the measurement value detection due to voltage induction. However, in this case there is a so-called ohmic coupling of the welding current circuits of the welding devices A, B (and/or the device current circuit of the electrical device EG) via the common ground line 8c, for example via a busbar. The common ground line 8c in this case forms, in a simplified manner, an ohmic resistance for the welding current circuits or the device current circuit(s).

If, for example, a welding current IA (or device current IEG) flows in the welding current circuit of the welding device A (or generally in the device current circuit of the electrical device EG), this leads in a known manner to a voltage drop across the ohmic resistance. This voltage drop changes the shared electrical potential. If the welding device B now detects, for example, a welding voltage UB as a measurement variable in its welding current circuit, this may lead to an incorrect measurement result due to the change in potential caused in another (welding) current circuit, analogous to the electromagnetic coupling. It is therefore advantageous if, in a manner analogous to the electromagnetic coupling, the welding device B in the ohmic coupling ignores the detected measurement values of the measurement variable during a welding current change $$\frac{dI_A}{dt}$$

in the welding current circuit of the welding device A (or generally during a change in the device current $$\frac{dI_{EG}}{dt}$$

in the device current circuit of the electrical device EG) or interrupts the detection of the measurement variable.

In the example shown, with the electromagnetic coupling of the ground lines 8a, 8b, a voltage induction in the welding current circuit of the welding device B takes place essentially only when the changes in the welding current $$\frac{dI_A}{dt}$$

over time (current ramps) occur in the welding current circuit of the welding device A. It is therefore sufficient to ignore the measurement values only during the actual welding current changes $$\frac{dI_A}{dt}$$

to ignore or to interrupt the detection of the measurement variable (time period Δt1 between tA1 and tE1, time period Δt2 between tA2 and tE2, etc.), as indicated by hatching in the lower diagram in FIG. 2.

In the case of ohmic coupling, on the other hand, it can be advantageous to ignore the measurement values or to interrupt the measurement value detection not only during the changes in the welding current $$\frac{dI_A}{dt},$$

but during the entire pulse current phase PP, for example in the period Δt3 between the start tA3 of a current rise and the end tE4 of a subsequent current fall, as indicated by hatching in the lower diagram in FIG. 2.

This is advantageous because the voltage drop in the ohmic coupling depends not on the the welding current changes $$\frac{dI_A}{dt}$$

over time but essentially on the absolute value of the welding current IA or the device current IEG in general. The difference between the base current IGA and the pulse current IPA is therefore essential for the voltage drop. The use of the measurement values of the measurement variable or the detection of the measurement variable, for example the welding voltage UB in the welding current circuit of the welding device B, therefore only takes place in the base current phases IG.

According to a further embodiment of the method, it is advantageous if the measurement variable detected by the welding device B, in particular the welding voltage UB, is transmitted to an external device for further use. For example, a welding robot can be provided as an external device which guides the welding torch 4b of the welding device B in a certain predetermined sequence of movements in order to produce a weld seam. The welding robot can, for example, use the detected measurement variable of the welding device B in order to control the movement of the welding torch 4b of the welding device B. In MIG/MAG welding, for example, a weld seam tracking process can be implemented in a control unit of the welding robot, as is known, for example, from EP 1 268 110 B2.

If the control unit of the welding robot uses, for example, the conventionally measured welding voltage UB of the welding device B (without interrupting the measurement value detection or ignoring the measurement values according to the invention) as the input variable for the control for weld seam tracking, this can lead to undesirable deviations in the weld seam tracking in some circumstances because the welding voltage UB is possibly falsified (by electromagnetic or ohmic coupling). It is therefore advantageous if the interference-suppressed measurement variable (e.g. welding voltage UB) is transmitted to the control unit of the welding robot and the control unit of the welding robot uses the interference-suppressed measurement variable to control/regulate the weld seam tracking, since this no longer contains the measurement values, which in some circumstances are incorrect, for example during the the welding current changes $$\frac{dI_A}{dt}$$

in the welding current circuit of the welding device A. The interference-suppressed measurement variable should be understood as the detected measurement variable without the measurement values during the relevant welding current changes $$\frac{dI_A}{dt}.$$

In TIG welding, the detected (and interference-suppressed) measurement variable can be used, for example, to regulate an electrode gap between the (non-consumable) electrode of the TIG welding torch and the workpiece. In addition, it would also be conceivable that the detected measurement variable is used, for example, for quality assurance, for example to analyze the welding process carried out with the welding device B or to monitor electrode wear, etc.

Finally, it should be pointed out that, of course, the welding assembly in FIG. 1 and the curves in FIG. 2 only show embodiments of the invention by way of example and are not to be understood as restrictive. For example, two MIG/MAG welding processes do not necessarily have to be used, as shown in FIG. 1, but any two or more welding devices with different welding processes (e.g. MIG/MAG, TIG, rod electrode welding) could be combined. It is important, on the one hand, that the at least one welding current circuit and the at least one device current circuit of the electrical device EG (in particular a second welding current circuit of a second welding device) are arranged relative to one another in such a way that they can at least partially influence one another electromagnetically and/or that there is an ohmic coupling via a common ground line. It is also important that a welding process is carried out in the at least one welding current circuit of the at least one welding device, wherein a measurement variable, in particular a welding voltage, is detected in order to regulate or control the respective welding process. A device current IEG that changes over time or welding current I that changes over time flows in at least one device current circuit, in particular the welding current circuit, at least at one point in time.

The invention claimed is:

1. A welding method carried out with at least one welding device comprising:

detecting measurement values of an electrical measurement variable in a welding current circuit to control a welding process of the welding device;

obtaining at least one point in time synchronization information from an electrical device that has a device current that changes over time;

transmitting the synchronization information to the at least one welding device; and the at least one welding device using the synchronization information to ignore the measurement values of the electrical measurement variable of the at least one welding device detected at the at least one point in time, wherein the electrical device is a second welding device that carries out a welding process with a welding current that changes over time and, transmits synchronization information about a change in the welding current $$\left(\frac{dI_A}{dt}\right),$$

and wherein the at least one welding device uses the synchronization information received to ignore the measurement values of the measurement variable detected during the change in the welding current $$\left(\frac{dI_A}{dt}\right),$$

and wherein the at least one welding device and the second welding device each carry out a welding process with a welding current that changes over time, wherein each of the at least one welding device and the second welding device detect measurement values of a variable in its welding current circuit, wherein the at least one welding device and the second welding device bidirectionally exchange synchronization information about the change in the welding current $$\left(\frac{dI_A}{dt}, \frac{dI_B}{dt}\right)$$

of the welding process being carried out which influences the measurement variable of the other welding device, and the at least one welding device and the second welding device use the synchronization information received from the at least one other welding device to ignore the measurement values of the measurement variable detected during the changes in the welding current $$\left(\frac{dI_A}{dt}, \frac{dI_B}{dt}\right).$$

2. The welding method according to claim 1, wherein the synchronization information contains information about a change in the device current $$\left(\frac{dI_{EG}}{dt}\right)$$

over time and the welding device uses the synchronization information to ignore the measurement values detected during the change in the device current $$\left(\frac{dI_{EG}}{dt}\right).$$

3. The welding method according to claim 1, wherein the electrical device is an electrical component of a welding system, is used as the electrical device.

4. The welding method according to claim 3, wherein the electrical device is a spot welding device or a welding robot.

5. The welding method according to claim 1, wherein a pulse welding process, a short arc welding process, a spray arc welding process or a welding process with reversing welding wire feed is used as the welding process with a welding current that changes over time.

6. The welding method according to claim 1, wherein the transmitted synchronization information contains temporal information about a start and an end of the change in the device current $$\left(\frac{dI_A}{dt}\right)$$

and/or change in welding current $$\left(\frac{dI_A}{dt}\right).$$

7. The welding method according to claim 1, wherein the synchronization information is transmitted before the change in the device current $$\left(\frac{dI_{EG}}{dt}\right)$$

and/or the change in the welding current $$\left(\frac{dI_A}{dt}\right).$$

8. The welding method according to claim 1, wherein a welding voltage and/or a welding current and/or an electrical welding resistance are detected as the measurement variable.

9. The welding method according to claim 1, wherein the at least one welding device transmits the detected measurement variable to an external device for further use, and wherein the external device uses the detected measurement variable to control a process of the external device or to analyze the welding process of the welding device.

10. The welding method according to claim 9, wherein the external device is a welding robot, which guides a welding torch of the at least one welding device to produce a weld seam and wherein the welding robot uses the measurement variable obtained to control a movement of the welding torch.

11. A welding assembly with at least one welding device for carrying out a welding process, wherein the at least one welding device has a welding circuit and is configured to detect measurement values of an electrical measurement variable in welding current circuit to control the welding process, wherein at least one other electrical device is provided in which a device current that changes over time flows in a device current circuit at least at one point in time, wherein the at least one electrical device is connected to the at least one welding device by means of a communication connection, wherein the at least one electrical device is configured to transmit synchronization information to the at least one welding device wherein the at least one welding device uses the synchronization information received to ignore the measurement values of the measurement variable detected at the point in time; and wherein at least two welding devices are provided, for carrying out a welding process with a welding current that changes over time and for detecting measurement values of a measurement variable in each case, wherein the welding devices are provided to alternately exchange synchronization information about the changes in the welding current $$\left(\frac{dI_A}{dt}, \frac{dI_B}{dt}\right)$$

over time in the welding process of the welding devices and to process the received synchronization information of the other welding device to ignore the measurement values of the measurement variables detected during the change in the welding current over time $$\left(\frac{dI_A}{dt}, \frac{dI_B}{dt}\right).$$

12. The welding assembly according to claim 11, wherein the electrical device is an electrical component of a welding system.

13. The welding assembly according to claim 12, wherein the electrical device is a spot welding device or a welding robot.

14. The welding assembly according to claim 11, wherein at least one welding device is configured to carry out a pulse welding process, a short arc welding process, a spray arc welding process or a welding process with reversing welding wire feed as a welding process with a welding current that changes over time.

15. The welding assembly according to claim 11, wherein the measurement variable is a welding voltage and/or a welding current and/or an electrical welding resistance.

16. The welding assembly according to claim 11, wherein the at least one welding device is configured to transmit the detected measurement variable to an external device for further use, and wherein the external device is configured to use the detected measurement variable to control a process of the external device and/or to analyze the welding process of the welding device, wherein the external device is a welding robot for guiding a welding torch of the welding device to produce a weld seam, and wherein the welding robot is configured to use the measurement variable obtained to control a movement of the welding torch.

* * * * *